Sept. 24, 1957          D. C. UNGER          2,807,245
WATER HEATED INTAKE MANIFOLD AND CONTROL SYSTEM THEREFOR
Filed Oct. 19, 1954          2 Sheets-Sheet 1
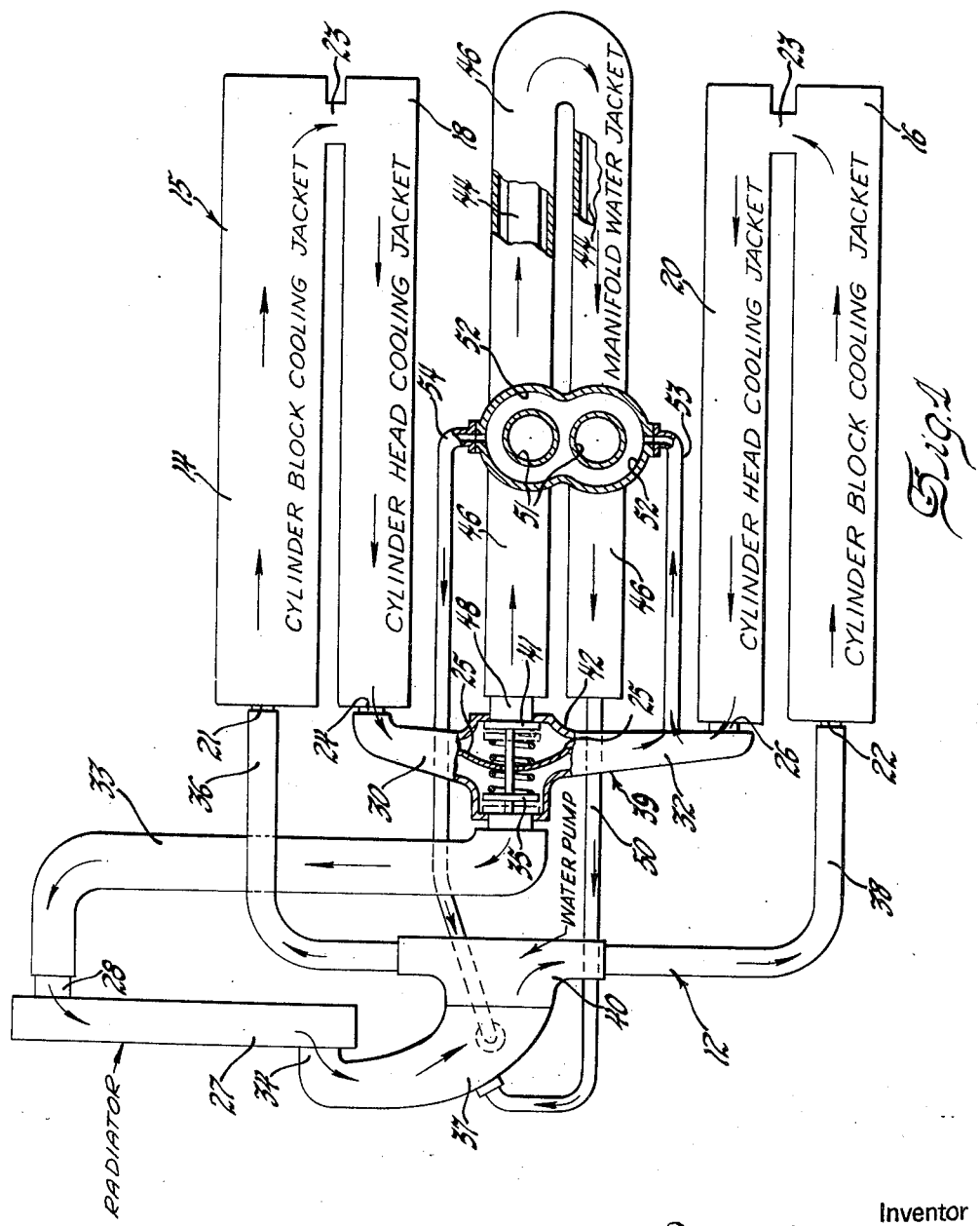
Inventor
Donald C. Unger
By
R. D. Burch
Attorney Sept. 24, 1957          D. C. UNGER          2,807,245
WATER HEATED INTAKE MANIFOLD AND CONTROL SYSTEM THEREFOR
Filed Oct. 19, 1954          2 Sheets-Sheet 2
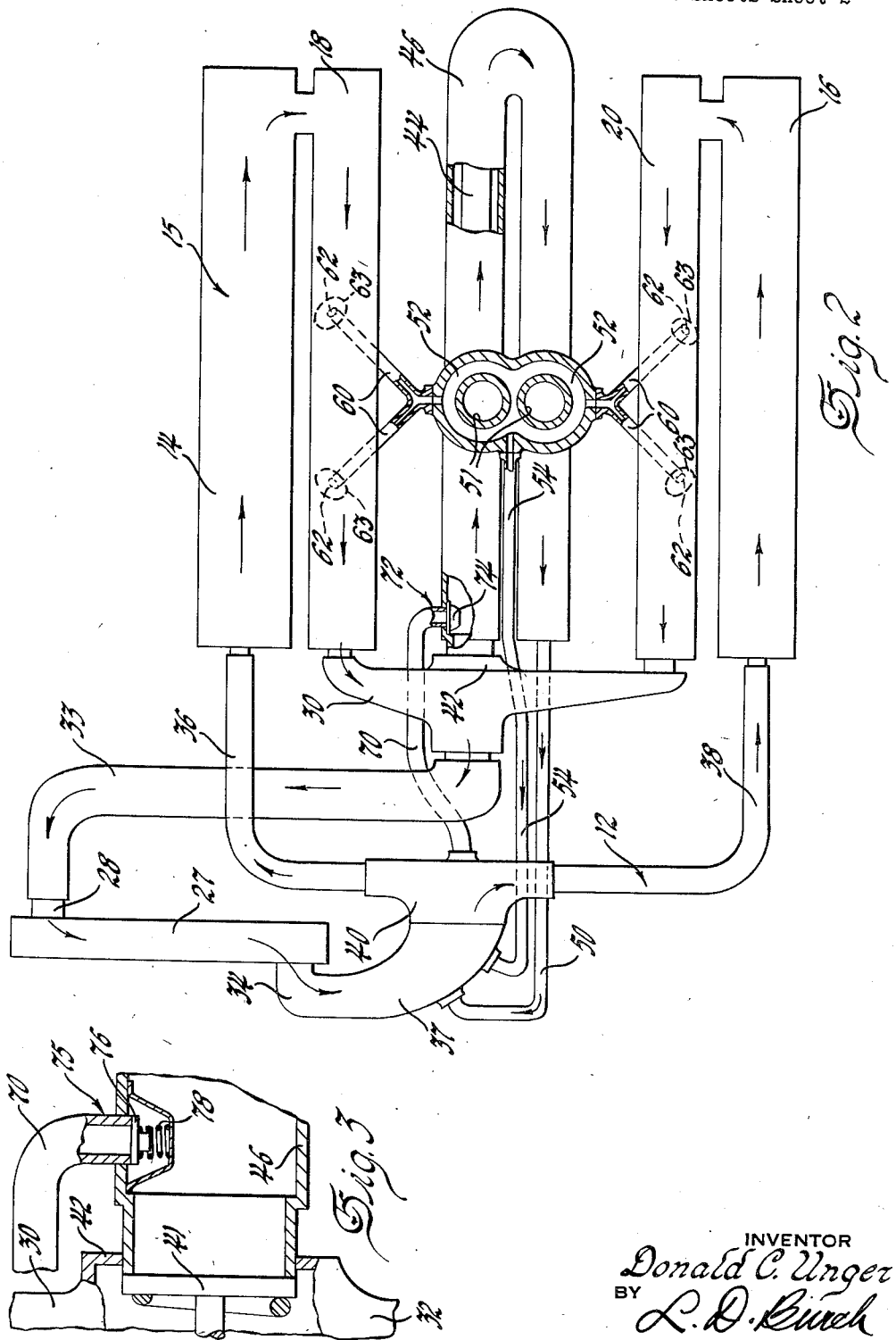
INVENTOR
Donald C. Unger
BY
L. D. Burch
ATTORNEY United States Patent Office 2,807,245
Patented Sept. 24, 1957

2,807,245

WATER HEATED INTAKE MANIFOLD AND CONTROL SYSTEM THEREFOR

Donald C. Unger, Grosse Pointe, Mich., assignor to General Motors Corporation, Detroit, Mich., a corporation of Delaware Application October 19, 1954, Serial No. 463,130

16 Claims. (Cl. 123—41.1)

The present invention relates to reciprocating combustion engines and more particularly to intake manifolds therefor and means for preheating the combustible charge for the engine and means of subsequently controlling the temperature of said charge.

In spark ignited engines the fuel is atomized in a charge of air to form a combustible mixture before it is compressed and ignited in the combustion chamber. Frequently, the fuel particles precipitate out of the mixture before it enters the combustion chamber and especially when the engine is operating at subnormal temperatures. Accordingly, numerous attempts have been made to preheat the combustible mixture in an effort to prevent the fuels precipitating. The most effective method of accomplishing this is by heating the intake manifold so that the charge flowing therethrough will absorb heat from the manifold. However, when the engine is hot and the fuel does not precipitate so readily, the heating of the manifold is objectionable as it tends to expand the charge and reduce the volumetric efficiency of the engine. Although there are numerous ways to preheat the charge the most widely accepted method is to employ the engine exhaust gases. Since the temperatures of the exhaust gases fluctuate with variations in the combustion conditions, they do not provide the even heating desired, especially when the engine is subjected to frequent periods of inoperativeness. Accordingly, there have been numerous attempts to heat the manifold by means of the engine coolants. Heretofore, it has been difficult to provide an intake manifold which is heated by the water in the cooling system and that has been widely adopted commercially. In order to be satisfactory, it is essential that the heating system preheat the charge when the engine is cold without preheating the charge when the engine has attained satisfactory conditions or interfering with the efficient operation of the engine cooling system.

It is now proposed to provide heating means for preheating the charge for an internal combustion engine and controls for said means. The heating means place a portion of the engine coolants in heat exchanging relation with the induction system. The control means which means which are responsive to the coolant temperature are adapted to allow the coolant in the cooling system to flow through the intake manifold and by-pass the radiator when the engine is cold. This same control may also allow the water to flow through the radiator and by-pass the manifold after the engine has reached normal temperatures.

As a modification, these control means in addition to directing a flow of hot coolant through the intake manifold jacket when the engine is cold, may also be adapted to divert the coolant from the coldest portion of the cooling system through the manifold jacket when the engine is hot. Thus in addition to preheating the charge under certain conditions, the present system may also cool the charge under other conditions.

Another objection to the use of water heated intake manifolds has been the necessity of increasing the volume of water present in the cooling system thus increasing the "warm up period." By employing the present control system the volume of cooling water circulating during the warm up period will remain substantially the same and thus the length of the warm up period will be unaffected.

When the fuel is atomized into the fuel charge, the charge flows through a venturi causing the pressure thereof to decrease. This together with the evaporation of the fuel causes a marked drop in the temperature of the charge. In fact under certain circumstances this drop may be large enough to cause the moisture in the atmosphere to freeze and form ice in the carburetor. The resultant ice may interfere with the operation of the carburetor or even cause it to become inoperative.

It is therefore proposed to provide an intake manifold which has more than one heating portion thereon. At least one of these portions may be placed in heat exchanging relation with the distribution passages so as to be most effective in heating the incoming charge. The application of heat to this portion may be intermittent and thermostatically controlled to heat or cool the charge only when necessary. At least one of the other portions may be in heat exchanging relation with a portion of the carburetor such as the riser. This portion is preferably heated at all times and heats only that portion of the carburetor which is subjected to icing and it does not have any material effect on the temperature of the charge.

Since the volume of coolant that will be in heat exchanging relation with the carburetor riser will be comparatively small, the coolant may be drawn from a localized "hot spot" in one of the cylinder heads without disturbing the effectiveness of the cooling system. By taking the coolant from such a hot spot, heat may be quickly applied to the carburetor before the entire engine becomes heated.

In the drawings:

Figure 1 is a diagrammatic representation of an engine cooling system embodying the present invention.

Figure 2 is a diagrammatic representation of an engine cooling system embodying a modification of the present invention.

Figure 3 is a fragmentary cross sectional view of a valve for the modification of Figure 2.

It is to be understood that the invention may be embodied in any internal combustion engine employing any coolant liquid. In the present instance the invention is shown as being employed with a water cooled V-type internal combustion engine having a cylinder block with two angularly disposed cylinder banks.

The cooling system 15 for the engine may include coolant jackets 14 and 16 in each of the engine cylinder blocks and coolant jackets 18 and 20 in each of the cylinder heads. The jackets 14 and 16 in the block may include a plurality of passages that extend around all of the cylinders so as to be in heat exchanging relation with the walls thereof. The jackets 18 and 20 in the heads may also include a plurality of passages that extend through the heads so as to be in heat exchanging relation with the walls of the combustion chambers and the exhaust valve passages. Inlets 21 and 22 for each jacket 18 and 20 may be provided in the block while one or more outlets 24 and 26 are provided for each head. Thus if the jackets 14, 16, 18 and 20 in the heads and the block are interconnected as at 23, the coolant may circulate therethrough and form a single cooling jacket system that will absorb the heat generated during the operation of an engine 10. Any suitable heat exchanger such as a radiator 27 may be provided for dissipating the heat absorbed by the coolant. In the present instance the inlet 28 for the radiator 27 is connected to the outlets 24 and 26 in the head by a manifold 39 having branches 30 and 32 and by a conduit 33. The outlet 34 for the radiator 27 is then connected through a coupling 37 and conduits 36 and 38 to the inlets 21 and 22. If it is considered necessary to employ a forced circulation, a pump 40 may be provided in the coupling 37 for forcing the coolant to flow through the radiator 27 and jackets. The pump 40 may be disposed in the conduits 36 and 38 with the inlet for the pump 40 communicating with the outlet 34 of the radiator 27 while the outlet of the pump 40 discharges into the jackets 14 and 16 at one end of the block. It has been found advantageous for the coolant to enter the engine in the coolest part of the engine, namely, the lower portions of the block jacket 14 and 16 and to leave from the hottest, namely, the cylinder head jackets 18 and 20. This will increase the ability of the coolant to absorb heat from the engine. Under such circumstances, the coolant is discharged from the jackets 18 and 20 adjacent the heads of the engine. A valve 42 may be employed to control the flow of coolant from the manifold 39 and through the conduit 33 leading to the radiator 27. The valve 42 may be of any desired form but it has been found advantageous to employ a thermally responsive double acting valve having closure members 35 and 41 movable between a hot and a cold position. It is very desirable that the thermally responsive element means 25 which controls the valve 42 be in heat exchanging relation with the water leaving the heads as this provides a very accurate index to engine temperature. When in the hot position, wherein the closure member 35 is off its seat and the closure member 41 is on its seat, the water may flow from the branches 30 and 32 directly into the radiator 27.

In order to heat the charge flowing through the distribution passages 44 of the intake manifold of the engine, a jacket 46 may be provided for the manifold and in heat exchanging relation with the distribution passages 44 thereof. In the cold position of the valve 42, wherein the closure member 41 is off its seat and the closure member 35 is on its seat as shown in the dot and dash line position of the valve, the manifold jacket 46 may communicate with the manifold 39 through inlet 48.

When the engine is below normal operating temperatures, the valve 42 will be in the cold position wherein the coolant leaving the head jackets 18 and 20 will flow directly through the manifold 39 and into the inlet manifold jacket 46 in heat exchanging relation with the distribution passages 44 therein. The coolant will then flow through the conduit 50 to the coupling 37 in which the pump 40 may be located. Conduits 36 and 38 will supply the coolant from the coupling 37 to the block jackets 14 and 16. Thus it may be seen that only the coolant in the cooling jackets 14, 16, 18 and 20 and the manifold jacket 46 will circulate during the warm up period and this will not flow through the radiator 27. Since the volume of coolant in the manifold jacket 46 is comparatively small, the duration of the warm up period will not be excessive.

When the engine approaches normal operating temperatures, the valve 42 will move to the hot position. At this time the coolant leaving the heads will be directed by the valve 42 into the conduit 33 and the flow of coolant into the manifold jacket 46 will cease. The coolant in the conduit 33 will then flow through the radiator 27 and be returned to the block by the coupling 37 in which the pump 40 may be located.

It may be seen that proper heating of the charge is provided but as soon as the engine becomes properly heated, the flow of heating liquid through the manifold may be completely shut off by valve 42. When the valve 42 and the closure member 41 are seated and there is no flow to the intake manifold jacket 46, due to the latent heat of evaporation of the combustible mixture, the atomization and resultant evaporation of the fuel would tend to reduce the temperature of the stagnant coolant which is trapped in the manifold. This would in turn provide a sub-normal temperature or refrigerated environment for the distribution passages 44. This relieves the high temperature normally encountered with intake manifolds having exhaust crossover passages. Thus the temperature of the charge will be reduced and the volumetric efficiency greatly improved.

It has been found that the atomization and evaporization of the fuel which occurs in the carburetor materially reduces the temperature of the carburetor. Under certain atmospheric conditions, the temperature may be lowered sufficiently to cause the moisture in the atmosphere to freeze in the carburetor in sufficient volume to interfere with the operation thereof. Accordingly, it has been found desirable to heat the carburetor riser 51 at all times irrespective of the engine temperatures. It is therefore proposed to provide a coolant jacket 52 around the riser means 51 which is independent of the manifold jacket 46. This permits the heat to be applied to the riser means 51 regardless of whether the manifold jacket is heated. For this purpose coolant is supplied to the riser jacket 52 by a conduit 53 which in turn communicates with the manifold 39. A discharge conduit 54 leading from the riser jacket 52 is connected directly to the intake side of the pump 40 and the coupling 37. Thus the circulation through the carburetor riser 51 will be continuous at all times regardless of the position of the thermostatically controlled valve 42.

When the system of Figure 1 is employed, the heat to the carburetor riser 51 is taken from the coolant leaving the cylinder heads 18 and 20. This coolant will be of moderate temperature representing the average engine temperature and it will not become hot until the entire head is heated. Accordingly in the modification shown in Figure 2, the coolant flowing through the carburetor riser jacket 52 may be drawn from a localized "hot spot" in a cylinder head. Thus the intake passages 60 for the riser jacket 52 may extend from the carburetor into the head to form one or more intakes 62 located around the exhaust valves or the exhaust ports generally indicated at 63. Since the exhaust gases become hot as soon as combustion occurs, this area will become hot very quickly. In addition, due to the fact that there is a very small amount of coolant adjacent this area, the coolant will become hot very rapidly. It can thus be seen that the period required before heat is applied to the carburetor will be very short. An outlet conduit 54 may be provided which extends between the jacket 52 and the inlet for the pump 40 the same as in the preferred embodiment. Thus the coolant will be drawn from the hot spot through the jacket 52 to the pump 40 whenever the engine is in operation.

In order to lower the temperature of the intake manifold when the engine has become heated, a conduit 70 may be provided between the pump outlet 40 and the manifold jacket. Thus the cold water from the radiator outlet 34 may pass through the pump 40 and be discharged through the conduit 70 into the manifold jacket. Since cold coolant is being pumped through the jacket 46 it will tend to lower the temperature thereof.

A valve 72 may be provided for controlling the flow of coolant through the conduit 70 into the manifold jacket 46. This valve 72 may be actuated by a thermostat 74 which is located in the jacket 46 of the manifold. Thus as the coolant becomes hot and the valve 42 stops the flow of coolant from the heat jackets 18 and 20 to the manifold jacket 46, the valve 72 will open and allow the cold coolant to flow from the pump 40 to the manifold jacket 46.

It should also be understood that the valve 72 may also be responsive to pressure. Accordingly, a modified valve 75 is shown and includes a closure member 76 that is normally held against its seat by a spring 78. When the valve 42 closes, the pressure in the manifold jacket 46 will drop. This will result in the pressure in the conduit, which is substantially the same as the pump pressure, overcoming the spring bias and causing the valve 72 to open. Thus the cold water from the pump 40 may be pumped into the manifold jacket 46 so as to cool the charge entering the engine.

It is to be understood that, although this invention has been described with specific reference to a limited number of embodiments thereof, it is not to be so limited since changes and alterations therein may be made which are within the full intended scope of this invention as defined by the appended claims.

What is claimed is:

1. In an engine having a cooling system containing a coolant in heat absorbing relation with said engine and a heat exchanger for dissipating the heat absorbed by said coolant, the combination of an intake manifold having distribution passages therein, a jacket in said manifold for placing said coolant in heat exchanging relation with said distribution passages, connecting means for interconnecting said jacket with said cooling system and with said heat exchanger, said connecting means including valve means movable between two positions, said valve means when in one of said positions directing the flow of coolants from said cooling system into said jacket and when in the other of said positions directing the flow of coolants from said cooling system into said heat exchanger, thermostatic means for moving said valve means from one of said positions to the other of said positions in response to the temperature of said coolant.

2. In an engine having a cooling system containing a coolant in heat absorbing relation with said engine and a heat exchanger for dissipating the heat absorbed by said coolant, the combination of an intake manifold having distribution passages, fuel mixing means including a carburetor and a carburetor riser on said manifold for receiving said carburetor, said fuel mixing means including at least one fuel supply passage communicating with said distribution passages, a first jacket disposed in heat exchanging relation with said fuel supply passages, a second jacket disposed in heat exchanging relationship with said distribution passages, means for connecting said first jacket to said cooling system and to said heat exchanger, valve means movable between two positions and being connected to said second jacket, said cooling system and to said heat exchanger, said valve means when in the first position directing the flow of coolants from said cooling system into said second jacket and when in the second position directing the flow of coolants from said cooling system into said heat exchanger.

3. An engine cooling system comprising a cooling jacket containing a coolant disposed in heat absorbing relation with the cylinders of said engine, heat dissipating means interconnected with said jacket, a pump for circulating said coolant through said jacket and said heat dissipating means, an intake manifold having distribution passages, fuel mixing means including a carburetor and a carburetor riser on said manifold for receiving said carburetor, said fuel mixing means having at least one fuel supply passage therein communicating with said distribution passages, a heating jacket in said manifold in heat exchanging relation with said distribution passages, passage means interconnecting said heating jacket with said cooling jacket, valve means disposed in said passage means and movable between two positions, said valve means when in one position directing the flow from said first jacket into said second jacket and when in the other position directing said flow of coolant from said first jacket to said pump.

4. The cooling system of claim 3 including a third jacket disposed in heat exchanging relation with said fuel supply passages, said last mentioned jacket being interconnected with said pump and said first jacket so that the coolant may flow continuously through said last mentioned jacket at all times.

5. An intake manifold adapted to be employed on an engine having a cooling system containing a coolant in heat absorbing relation with the cylinders in said engine, said manifold comprising a plurality of distribution passages and a carburetor riser for supporting a carburetor on said manifold, fuel supply passages positioned to communicate with said carburetor and said distribution passages, said distribution passages being positioned to distribute the combustible charge from said carburetor to said cylinders, a jacket disposed in heat exchanging relation with said distribution passages and being adapted for connection to said cooling system, a second jacket independent of said first jacket disposed in heat exchanging relation with said fuel supply passages and being adapted for connection to said cooling system, to allow coolant to flow therethrough independent of the circulation through said first jacket.

6. The intake manifold of claim 5 wherein said first jacket is adapted to have valve means associated therewith for controlling the flow of coolant therethrough.

7. The combination of claim 2 including a conduit connecting said second jacket with the output of said heat exchanger and second valve means in said conduit for controlling the flow of coolant from said heat exchanger into said second jacket, said second valve being effective to permit the flow of fluid through said conduit into said second jacket when said first valve is in said second position.

8. The combination of claim 7 including thermal responsive means connected to said second valve and disposed in said second jacket in heat exchanging relation with the coolant therein, said thermal responsive means being effective to close said second valve when the temperature of the coolant in said second jacket is below a predetermined amount and to open said second valve when said temperature is above said predetermined amount.

9. The combination of claim 7 including pressure responsive means operatively connected to said second valve and being effective to open said valve when the difference in pressure in said second jacket and said conduit is more than a predetermined amount and to close said valve when said pressure difference is less than a predetermined amount.

10. In an engine having a cooling system containing a coolant in heat absorbing relation with said engine, a heat exchanger for dissipating the heat absorbed by said coolant and a pump connected to the output of said heat exchanger for forcing said coolant to flow through said cooling system, the combination of an intake manifold having distribution passages therein, a coolant jacket in said manifold for placing said coolant in heat exchanging relation with said distribution passages, connecting means for interconnecting said jacket with said cooling system and said heat exchanger, said connecting means including valve means movable between two positions, said valve means when in one of said positions directing the flow of coolant from said cooling system into said coolant jacket and when in the other of said positions directing the flow of said coolants from said cooling system into said heat exchanger, a conduit interconnecting said coolant jacket with the output of said pump, and valve means in said conduit for controlling the flow of coolant from said pump into said jacket.

11. The combination of claim 10 including thermal responsive means connected to said second valve means and being disposed in said coolant jacket in heat exchanging relation with the coolant therein, said thermal responsive means being effective to close said second valve when the temperature of the coolant in said jacket is below a predetermined amount and to open said valve when said temperature is above said predetermined amount.

12. The combination of claim 10 including pressure responsive means operatively connected to said second valve means and being effective for moving said second valve means to the closed position when the difference in pressure between the conduit and the coolant jacket is less than a predetermined amount and to open said second valve means when said pressure difference is more than said predetermined amount.

13. In an engine having at least one combustion chamber with exhaust means for allowing hot exhaust gases to flow out of said chamber, a cooling system containing a coolant in heat absorbing relation with said combustion chamber and said exhaust means, the combination of an intake manifold having distribution passages communicating with said combustion chamber, fuel mixing means including a carburetor and a carburetor riser on said manifold for receiving said carburetor and having at least one fuel supply passage communicating with said distribution passage, a first jacket disposed in heat exchanging relation with said distribution passages interconnected with said cooling system for allowing said coolant to flow therethrough, a second jacket disposed in heat exchanging relation with said fuel supply passages and a conduit having the outlet end thereof communicating with said second jacket and the inlet end thereof communicating with said cooling system independently of said first jacket immediately adjacent said exhaust means for drawing the coolant directly from this area.

14. In an engine having a cylinder head with combustion chamber means and exhaust means therein for discharging the exhaust gases from said combustion chamber means and into an exhaust manifold located on the exterior of said engine, the combination of a cooling jacket having a portion thereof disposed in said head in heat exchanging relation with said combustion chamber means and said exhaust means for absorbing heat therefrom, a fuel carburetor device having a fuel supply passage therethrough, a heating jacket in heat exchanging relation with said fuel supply passage, a conduit having the outlet communicating with said heating jacket and the inlet disposed inside of said head and communicating with said cooling system immediately adjacent said means for drawing heated coolant directly from this area.

15. In an engine having a cylinder head with combustion chamber means and exhaust means therein for allowing hot exhaust gases to flow out of said combustion chamber means and into an exhaust manifold located on the exterior of said engine, a cooling system having a cooling jacket with a portion thereof disposed in said head and containing a coolant in heat absorbing relation with said combustion chamber means and said exhaust means for absorbing heat therefrom, and a radiator interconnected with the outlet of said cooling jacket for receiving heated coolant therefrom for dissipating the heat absorbed by said coolant, the combination of an intake manifold having distribution passages communicating with said combustion chamber means, fuel mixing means including a carburetor and a carburetor riser on said manifold for receiving said carburetor, said fuel mixing means including at least one fuel supply passage communicating with said distribution passages, a heating jacket disposed in heat exchanging relation with said fuel supply passages and a conduit in parallel to said cooling system outlet with the inlet end thereof communicating with said cooling system immediately adjacent said means for drawing the coolant directly from this area and the outlet end thereof communicating with said heating jacket.

16. The combination of claim 15 including a pump connected to the output of said radiator for forcing coolants to flow through said cooling system and an outlet for said jacket communicating with said pump adjacent the outlet of said radiator.

References Cited in the file of this patent

UNITED STATES PATENTS

| 1,164,675 | Sturtevant et al. | Dec. 21, 1915 |
| 1,550,862 | Wolf | Aug. 25, 1925 |
| 1,822,147 | Horning | Sept. 8, 1931 |
| 2,155,776 | Starr | Apr. 25, 1939 |

FOREIGN PATENTS

| 170,079 | Great Britain | Oct. 10, 1921 |